Patented Aug. 4, 1953

2,647,888

UNITED STATES PATENT OFFICE 2,647,888

PLASTIC TALL OIL ROSIN FRACTION

Don E. Floyd, Minneapolis, Minn., assignor to General Mills, Inc., a corporation of Delaware No Drawing. Application November 19, 1949, Serial No. 128,500

6 Claims. (Cl. 260—97.5)

1

The present invention relates to a resinous product derived from the rosin acid fraction of tall oil.

Tall oil is an oil recovered from paper-making operations and contains approximately 40–45% of fatty acids, 45–50% of rosin acids, and 5–15% of non-saponifiables. Various methods have been evolved for utilizing tall oil, either in its original state or by fractionating it in one way or another to recover the fatty acids and the rosin acids. One method of effecting such fractionation involves fractional distillation which results in a recovery of a large proportion of the fatty acids, and which also results in the recovery of a rosin acid fraction which may contain substantial quantities of fatty acid and a small amount of unsaponifiable material. A typical rosin fraction from tall oil will contain approximately 69% rosin and approximately 29% fatty acid. This may vary from 50–90% rosin acids with the remainder composed essentially of fatty acids and a small amount of unsaponifiable material. Usually the amount of rosin may vary from approximately 60–80% and the fatty acid may vary from approximately 20–40% with a minor amount of unsaponifiable material.

The price of tall oil is relatively low and accordingly the fatty acids recovered from it can be available at a relatively low price provided some disposition of the rosin fraction can be made. This rosin fraction represents about 45% of the total yield of products from tall oil and presents very definite problems in disposition at a price which will offset its cost of manufacture.

The rosin fraction described above, when warm, is a homogeneous liquid, but upon cooling becomes a heterogeneous mixture of rosin crystals and liquid fatty acids, making handling of it an extremely irksome procedure. A drum of the rosin fraction when cool will contain a layer of hard rosin at the bottom, a layer of fatty acid-rosin slush in the middle, and a layer of liquid fatty acid at the top. Inasmuch as rosin is ordinarily used for further processing, such as for the production of ester gum or for the production of varnish, it becomes necessary to transfer the rosin product to a processing kettle.

While commercial rosin presents its own handling difficulties, it is still easier to handle than the above tall oil rosin fraction. The greater ease of handling of commercial rosin has been a further reason for dissatisfaction with present tall oil rosin fractions. Commercial rosin is a solid at ordinary temperature, and any processor who uses rosin can merely cut open the drum in which the rosin is shipped and chop it up into suitable size pieces which may then be added to the processing kettle. Since the above rosin fraction of tall oil, however, contains an appreciable quantity of liquid fatty acid, it will be appreciated that this possibility of transferring the material from the drum to the processing kettle is not feasible. Likewise, since the rosin fraction has a hard cake at the bottom of the drum, the contents cannot be poured out of the drum. Moreover, it is not economically feasible to heat the drums up to suitable temperatures to liquefy the rosin fraction. Some of the rosin crystals in the rosin fraction have melting points of about 275° F. Obviously the provision of means for liquefying the rosin in the drums and for pumping the liquid rosin into a processing kettle would be prohibitive, particularly where the temperature of the rosin must be elevated to 275° F. or higher. Thus even though the price of tall oil rosin fraction may be materially lower than that of industrial rosin, and even though coating products made from this fraction have superior quality, most manufacturers are willing to forego these advantages in order to eliminate the difficult handling encountered with this tall oil rosin fraction.

Even the use of commercial rosin in processing presents difficulties. Thus, for example, in the production of varnish it is customary to body the drying oil in a processing kettle, and at the completion of the bodying period, large lumps of rosin which previously had been chopped out of a rosin drum are added to the processing kettle for dispersing the oil polymers. The rosin is then neutralized by liming or by esterification with a polyhydric alcohol. It will be apparent that the dropping of large lumps of rosin into a body of oil at bodying temperatures of 500° F. and higher presents a very serious problem and a definite personal injury hazard. Furthermore, the lumps of rosin dropped into the processing kettle invariably settle to the bottom of these direct-fired kettles, and as a result, before the rosin is melted and dispersed in the drying oil there is an excellent opportunity for the rosin to be overheated and thus darkened, thereby resulting in a dark varnish.

It has now been found that many of these difficulties encountered in tall oil rosin fractions may be overcome by esterifying the rosin acid fraction with an excess of a polyhdric alcohol containing more than two hydroxyl groups, such as glycerol, pentaerythritol, or 2,2,6,6-tetramethylolcyclohexanol. The resultant products are light-colored, viscous liquids, having low acid numbers, and containing reactive hydroxyl groups. Some of them have low enough viscosities so that they can be poured or pumped at room temperature, while others may require some warming in order for them to be pourable or readily pumpable.

The products contain reactive hydroxyl groups rendering them suitable for further transformations into varnishes, alkyds, resins, and the like.

As was pointed out previously, the invention involves a product resulting from the esterification of a rosin fraction of tall oil with an excess of a polyhydric alcohol having more than two hydroxyl groups, such that the reaction product has at least one free hydroxyl group. Considerable variation is possible in the relative proportions of the rosin acid fraction and the polyhydric alcohol. It is essential that at least one hydroxyl group be esterified with the rosin acid and that at least one hydroxyl group be free. This makes possible considerable variation in the relative proportions of the acid and the alcohol, particularly in view of the fact that the invention contemplates polyhydric alcohols having varying numbers of hydroxyl groups such as glycerol and 2,2,6,6-tetramethylolcyclohexanol. In general, however, it has been found that the variation in the proportion of the reactants such that at least one hydroxyl group is esterified and that at least one hydroxyl group is free, accomplishes the desired result.

As to the conditions of reaction, these likewise may be varied widely in accordance with known esterification techniques. Thus the esterification may be effected in the presence of an acid or basic catalyst, and in the presence or absence of a solvent. Usually it is desirable to maintain a blanket of inert atmosphere over the surface of the reactants such as by means of carbon dioxide or nitrogen.

The reaction temperature is subject to some variation. For example, it may be in the range of 150–200° C. if a solvent is used, or in the range of 250–300° C. if no solvent is used. The time required for reaction will depend on the reactant ratio, reaction temperature, use of solvent, and other factors. It will ordinarily be in the range of 5 to 12 hours. The reaction time should be great enough to bring the acid number to 20 or lower without causing serious side reactions, such as charring, ether formation, loss of hydroxyl groups, and other undesirable side reactions.

Further variations in the esterification conditions may be evident from the following examples.

Example 1

A mixture of 36.8 g. of glycerol, 132 g. of rosin acid fraction of tall oil (which analyzed for 72.1% rosin acids, 4.2% unsaponifiable and 23.7% fat acids) and 0.1 g. of zinc oxide was placed in a 3-neck flask, fitted with a mechanical stirrer, thermometer and distilling head. The mixture was stirred and heated gradually under a blanket of nitrogen gas to 275° C. during a period of four hours and then held at 275° C. for one hour. The mixture was cooled and removed from the flask. The product was a viscous, light-colored liquid that was slightly cloudy. The acid number was 4.9 and the per cent hydroxyl was 4.1. The color was estimated as WW on the rosin scale and the viscosity at 90° C. was N—O on the Gardner scale (standards at 25° C.). The viscosity of a sample of commercial WW gum rosin at 90° C. was found to be too high to obtain a reading, but was about Z–6 at 100° C.

Example 2

The following reactants were used:

Rosin acid fraction of tall oil (same as Example 1) _____ g__ 60
Glycerol _____ g__ 18
p-Toluenesulfonic acid hydrate _____ g__ 0.3
Xylol _____ ml__ 50

The mixture was placed in a flask connected to a Stark and Dean water separator and condenser. The mixture was refluxed and enough xylol was added to give a reaction temperature of about 180° C. Water was gradually removed and collected (approx. 4 ml.) during a period of 12 hours. Then the reaction mixture was cooled, washed with water and dried over sodium sulfate. The xylene was evaporated under reduced pressure at about 100° C., leaving a clear, viscous liquid as product. The acid number of the product was 0.25 and the per cent hydroxyl was 2.4. The color was estimated as K—I on the rosin scale, and the viscosity at 90° C. as N (Gardner standards at 25° C.).

Example 3

A mixture of 108 g. of the rosin acid fraction of tall oil of Example 1 and 27.2 g. of pentaerythritol was placed in a 3-neck flask, equipped as in Example 1. The mixture was mechanically stirred and gradually heated under a blanket of nitrogen gas to 275° C. during a period of 3½ hours and held at that temperature 2½ hours more. A light-colored, viscous liquid was obtained upon cooling. The acid number was 7.7 and the per cent hydroxyl was 5.6. The color was estimated as WG on the rosin scale and the viscosity at 90° C. was between Z–1 and Z–2 on the Gardner scale.

Example 4

A reaction mixture composed of 13.6 g. of pentaerythritol, 62.0 g. of the rosin acid fraction of tall oil of Example 1 and xylol was heated under reflux in a flask connected to a Stark and Dean water separator. Sufficient xylol was gradually added to maintain the reaction temperature at 275–280° C. After about 5½ hours 3.5 ml. of water had been collected. A small amount of the pentaerythritol was lost during reaction due to sublimation on the walls of the separator and condenser. The reaction mixture was filtered and the solvent was evaporated off at about 100° C. under reduced pressure. The product which remained had an acid number of 5.0 and per cent hydroxyl of 2.7. The color was WG and the viscosity at 90° C. was V on the Gardner scale.

Example 5

A reaction mixture composed of 30.7 g. of glycerol and 155 g. of the rosin acid fraction of tall oil of Example 1 was stirred and gradually heated under nitrogen, as in Example 1, to 275° C. during a period of 3½ hours. It was held at 275° C. for two more hours and then gradually cooled to room temperature. The acid number of the product was 1.1 and the per cent hydroxyl was 4.8. At 90° C. the viscosity on the Gardner scale was between S and T while the color was between WW and X. The product was slightly cloudy.

Example 6

The procedure followed was identical with that described in Example 5, using 36.8 g. of glycerol and 132 g. of the same rosin acid fraction of tall oil. The slightly cloudy, viscous liquid product obtained had an acid number of 1.1 and per cent hydroxyl of 7.2. The viscosity at 90° C. on the Gardner scale was M and the color was between WW and X.

Example 7

A mixture of 13.6 g. of pentaerythritol, 90 g. of the rosin acid fraction of tall oil of Example 1 and 0.2 g. of zinc oxide was stirred and heated to 275° C. during a period of 3½ hours and then held at that temperature for three more hours. The equipment used and the procedure followed were similar to those described in Example 1. The reaction product had an acid number of 5.0 and per cent hydroxyl of 1.1. The color was WG but the viscosity at 90° C. was too high to obtain a reading.

Example 8

A mixture of 51 lbs. 14 oz. of the rosin acid fraction of tall oil of Example 1 and 15 lbs. 15 oz. of glycerol was stirred and gradually heated to 265° C. under a blanket of carbon dioxide gas in a stainless steel kettle. Water was distilled off and collected during the reaction. After 1½ hours more at 265° C. the reaction mixture was cooled and removed from the kettle. It was a slightly cloudy, light-colored, viscous liquid. The viscosity at 90° C. was M and the color was between WW and X. The acid number was 1.0 and the per cent hydroxyl was 7.3.

The cloudiness of the product was removed in the following manner. A sample consisting of 150 g. was heated at 175-200° C. and a vacuum of about 10 mm. was applied, causing 6.1 g. of glycerol to distill off. This amounts to about 4% of free glycerol in the original reaction product. The new product was perfectly clear and had a color of WW on the rosin scale, viscosity at 90° C. on the Gardner scale of between O and P and per cent hydroxyl of 5.8. This is equivalent to esterification of about 1.3 of the hydroxyl groups on the glycerol.

The product is insoluble in water, partly soluble in 95% ethanol, methanol and glycerol, and completely soluble in glyceride oils, fatty acids and solvents such as xylene, mineral spirits, acetone, butyl acetate and cellosolve (based on 1 g. of product with 10 ml. of solvent).

Example 9

A mixture of 39.6 g. of 2,2,6,6-tetramethylolcyclohexanol and 105 g. of the rosin acid fraction of tall oil (which analyzed for 77.4% rosin acids, 4.5% unsaponifiable and 18.1% fat acids) was stirred and gradually heated under nitrogen to 260° C. during four hours and then to 270° C. during the next 1½ hours. At the end of that time the acid number was 57.5. Therefore, to 100 g. of the reaction mixture was added 0.1 g. of zinc oxide and the reaction was continued at 270° C. under nitrogen for 2 hours and under vacuum (18 mm.) for 1 hour. The product had an acid number of 24.3 and the per cent hydroxyl was 2.4. The viscosity at 90° C. was slightly higher than Z-6 and the color was WG on the rosin scale.

Example 10

A mixture of 39.6 g. of 2,2,6,6-tetramethylolcyclohexanol and 105 g. of the rosin acid fraction of tall oil (analyzing for 62.6% rosin acids, 4.5% unsaponifiable and 32.9% fat acids) was stirred and gradually heated to 260° C. during 4 hours and then to 270° C. during the next 1½ hours in an atmosphere of nitrogen. At the end of that time the acid number was 58.7. Therefore, to 100 g. of the reaction mixture was added 0.1 g. of zinc oxide and the reaction was continued in the same manner as in Example 9. The final product had an acid number of 13.4 and the per cent hydroxyl was 1.5. The viscosity at 90° C. was between Z and Z-1 on the Gardner scale and the color was WG on the rosin scale.

While numerous modifications of the invention have been described, other modifications are also possible without departing from the spirit of the invention.

I claim as my invention:

1. A rosin composition comprising the rosin acid fraction of tall oil containing at least 60% rosin acid, the remainder being composed essentially of fatty acids and a small amount of unsaponifiable material esterified with a monomeric polyhydric alcohol having more than two hydroxyl groups, the esterified polyhydric alcohol having at least one hydroxyl group esterified by the rosin acid fraction, and at least one free hydroxyl group.

2. A rosin composition comprising the rosin acid fraction of tall oil containing from 60-80% rosin acid, the remainder being composed essentially of fatty acids and a small amount of unsaponifiable material esterified with a monomeric polyhydric alcohol having more than two hydroxyl groups, the esterified polyhydric alcohol having at least one hydroxyl group esterified by the rosin acid fraction, and at least one free hydroxyl group.

3. A rosin composition comprising the rosin acid fraction of tall oil containing from 60-80% rosin acid, the remainder being composed essentially of fatty acids and a small amount of unsaponifiable material esterified with glycerol, the esterified glycerol having at least one hydroxyl group esterified by the rosin acid fraction, and at least one free hydroxyl group.

4. A rosin composition comprising the rosin acid fraction of tall oil containing from 60-80% rosin acid, the remainder being composed essentially of fatty acids and a small amount of unsaponifiable material esterified with pentaerythritol the esterified pentaerythritol having at least one hydroxyl group esterified by the rosin acid fraction, and at least one free hydroxyl group.

5. A rosin composition comprising the rosin acid fraction of tall oil containing from 60-80% rosin acid, the remainder being composed essentially of fatty acids and a small amount of unsaponifiable material esterified with 2,2,6,6-tetramethylolcyclohexanol, the esterified 2,2,6,6-tetramethylolcyclohexanol having at least one hydroxyl group esterified by the rosin acid fraction, and at least one free hydroxyl group.

6. A rosin composition comprising the rosin acid fraction of tall oil containing from 60-80% rosin acid, the remainder being composed essentially of fatty acids and a small amount of unsaponifiable material esterified with glycerol, the esterified glycerol having about 1.3 hydroxyl groups esterified.

DON E. FLOYD.

References Cited in the file of this patent

UNITED STATES PATENTS

| Number | Name | Date |
|---|---|---|
| 2,270,947 | Hough | Jan. 27, 1942 |
| 2,340,043 | Clare | Jan. 25, 1944 |
| 2,432,333 | Palmer | Dec. 9, 1947 |
| 2,470,964 | Wittcoff | May 24, 1949 |
| 2,493,486 | Greenlee | Jan. 3, 1950 |
| 2,572,035 | Jordan et al. | Oct. 23, 1951 |

FOREIGN PATENTS

| Number | Country | Date |
|---|---|---|
| 115,753 | Australia | Mar. 4, 1943 |